US012083526B1

(12) United States Patent
Nassef

(10) Patent No.: US 12,083,526 B1
(45) Date of Patent: Sep. 10, 2024

(54) WASTE STREAM HOMOGENIZING APPARATUS AND METHOD

(71) Applicant: Namon A. Nassef, Pensacola, FL (US)

(72) Inventor: Namon A. Nassef, Pensacola, FL (US)

( * ) Notice: Subject to any disclaimer, the term of this patent is extended or adjusted under 35 U.S.C. 154(b) by 0 days.

(21) Appl. No.: 18/444,895

(22) Filed: Feb. 19, 2024

Related U.S. Application Data

(60) Provisional application No. 63/451,688, filed on Mar. 13, 2023.

(51) Int. Cl.
*B02C 18/00* (2006.01)
*B01F 33/80* (2022.01)
*B01F 101/00* (2022.01)

(52) U.S. Cl.
CPC .... *B02C 18/0092* (2013.01); *B01F 33/83611* (2022.01); *B01F 2101/305* (2022.01); *B02C 2201/06* (2013.01)

(58) Field of Classification Search
None
See application file for complete search history.

(56) References Cited

U.S. PATENT DOCUMENTS 241,653 A * 5/1881 Harrison ................. A47J 43/25 241/153
429,850 A * 6/1890 Eaton et al. ............ B02C 18/30 241/89.4
442,213 A * 12/1890 Young ...................... A23G 9/12 165/109.1
1,757,616 A * 5/1930 Bunce ................... F26B 17/003 366/186
1,794,214 A * 2/1931 Thurm .................... B01F 27/91 241/46.11
1,891,396 A * 12/1932 Prutzman ........... B01D 25/1645 210/219
1,924,080 A * 8/1933 Gram ........................ D01F 2/08 241/46.11
2,089,702 A * 8/1937 Lomax ............... B01D 29/6476 210/408
2,092,992 A * 9/1937 Thalman ............... B01F 25/451 241/101.5
2,107,040 A * 2/1938 Lomax ................. B01D 29/906 210/773
2,236,769 A * 4/1941 Armbruster ........ B01D 21/0039 209/225
2,240,841 A * 5/1941 Flynn .................... B01F 27/112 241/98
2,578,274 A * 12/1951 Dunton ..................... D01F 2/08 241/46.11
2,662,821 A * 12/1953 Muench ................... D21C 7/00 34/178

(Continued)

*Primary Examiner* — Robert J Popovics
(74) *Attorney, Agent, or Firm* — J. Nevin Shaffer, Jr.

(57) ABSTRACT

An improved waste stream homogenizing apparatus and method includes a housing with an inlet port configured to receive a waste stream and direct the waste stream to an exit port. A central shaft configured to rotate within the housing. A blade with a cutting edge connected with a blade hub, where the blade hub is connected with the central shaft and a sizing screen with sizing holes, the sizing holes arranged in a non-concentric pattern on the sizing screen, where the cutting edge of the blade is in contact with the sizing screen where the waste stream is forced past the cutting edge and the sizing screen as the central shaft rotates.

13 Claims, 7 Drawing Sheets

(56) References Cited

U.S. PATENT DOCUMENTS

| | | | | | |
|---|---|---|---|---|---|
| 2,798,698 | A * | 7/1957 | Dooley | D01D 1/065 | 366/182.1 |
| 2,801,084 | A * | 7/1957 | Krupp | A23L 3/015 | 366/144 |
| 2,960,318 | A * | 11/1960 | Caillaud | B01F 33/82 | 366/181.7 |
| 2,997,077 | A * | 8/1961 | Rodrigues, Jr. | G01N 1/18 | 141/130 |
| 3,055,208 | A * | 9/1962 | Gallus | B01D 29/03 | 210/415 |
| 3,214,019 | A * | 10/1965 | Griffin, III | E21B 21/06 | 415/121.2 |
| 3,240,334 | A * | 3/1966 | Wyman | G01N 21/9018 | 209/524 |
| 3,488,477 | A * | 1/1970 | Doak | G06G 1/04 | 235/88 F |
| 3,631,985 | A * | 1/1972 | Taeger | B01D 35/06 | 210/222 |
| 3,640,395 | A * | 2/1972 | Kinney | B01D 29/682 | 210/411 |
| 3,660,225 | A * | 5/1972 | Verreyne | D21C 9/10 | 8/111 |
| 3,679,182 | A * | 7/1972 | Clocker | B01F 25/641 | 366/290 |
| 3,702,659 | A * | 11/1972 | Clark | B01D 25/26 | 210/486 |
| 3,736,583 | A * | 5/1973 | Smith | G01M 99/00 | 33/561.1 |
| 3,836,464 | A * | 9/1974 | Brookins | B01D 29/58 | 210/489 |
| 4,039,149 | A * | 8/1977 | Gajdos | B01J 19/002 | 241/46.11 |
| 4,052,009 | A * | 10/1977 | Penque | D21B 1/345 | 241/1 |
| 4,059,401 | A * | 11/1977 | Hanslik | B29C 48/92 | 432/139 |
| 4,066,246 | A * | 1/1978 | Korstvedt | F16J 15/34 | 366/293 |
| 4,076,681 | A * | 2/1978 | Boehme | B01F 27/87 | 366/330.1 |
| 4,321,822 | A * | 3/1982 | Marple | G01N 15/0255 | 73/863.22 |
| 4,350,305 | A * | 9/1982 | van Hoorn | B01F 35/00 | 241/46.11 |
| 4,430,214 | A * | 2/1984 | Baker | E04H 4/1209 | 415/121.1 |
| 4,462,901 | A * | 7/1984 | Gauld | D21D 5/02 | 209/389 |
| 4,657,636 | A * | 4/1987 | Satomi | B01D 29/036 | 241/46.11 |
| 5,067,805 | A * | 11/1991 | Corle | G02B 21/0044 | 359/638 |
| 5,143,630 | A * | 9/1992 | Rolchigo | B01D 33/722 | 210/405 |
| 5,269,923 | A * | 12/1993 | Diemer | B01D 29/94 | 210/415 |
| 5,384,964 | A * | 1/1995 | McKay | B43L 9/002 | 33/565 |
| 5,567,463 | A * | 10/1996 | Schaaf | B29C 48/67 | 425/197 |
| 5,810,474 | A * | 9/1998 | Hidalgo | B01J 19/006 | 366/172.1 |
| 5,868,495 | A * | 2/1999 | Hidalgo | B01F 25/3131 | 366/172.1 |
| 6,106,703 | A * | 8/2000 | Nassef | C02F 1/385 | 4/321 |
| 6,337,308 | B1 * | 1/2002 | Adams | B01F 33/83 | 366/302 |
| 6,502,980 | B1 * | 1/2003 | Ekstrom | B01F 27/50 | 366/307 |
| 6,562,763 | B2 * | 5/2003 | Adams | E21B 21/062 | 366/302 |
| 6,581,859 | B2 * | 6/2003 | Adams | B01F 25/451 | 241/101.8 |
| 6,905,609 | B2 * | 6/2005 | Nassef | B61D 35/007 | 366/144 |
| 7,134,621 | B2 * | 11/2006 | Choi | B01F 33/811 | 241/296 |
| 7,473,375 | B2 * | 1/2009 | Stoerzer | B01D 29/01 | 210/791 |
| 8,002,979 | B2 * | 8/2011 | Bryan-Brown | E03C 1/2665 | 241/DIG. 38 |
| 8,596,858 | B2 * | 12/2013 | Ohashi | B01F 27/9021 | 366/181.4 |
| 9,385,495 | B1 * | 7/2016 | Hilbert | H01R 39/28 | |
| 9,393,505 | B2 * | 7/2016 | Rusconi Clerici | B04B 5/10 | |
| 11,027,228 | B1 * | 6/2021 | Zou | C02F 1/42 | |
| 11,103,812 | B2 * | 8/2021 | Canaia | B29C 48/2545 | |
| 11,845,023 | B2 * | 12/2023 | Cao | B01D 33/15 | |
| 11,867,310 | B2 * | 1/2024 | Anagnos | F16K 1/54 | |
| 11,911,719 | B2 * | 2/2024 | Brancazio | B01D 29/608 | |
| 2004/0154968 | A1 * | 8/2004 | Nassef | B60R 15/00 | 210/179 |
| 2008/0035552 | A1 * | 2/2008 | Lee | C02F 1/003 | 210/446 |
| 2008/0164191 | A1 * | 7/2008 | Bryan-Brown | E03F 1/002 | 241/79 |
| 2008/0173594 | A1 * | 7/2008 | Stoerzer | B01D 29/01 | 210/791 |
| 2014/0224749 | A1 * | 8/2014 | Hopkins | B29C 48/2735 | 210/791 |
| 2015/0136683 | A1 * | 5/2015 | Rusconi Clerici | B01D 33/00 | 210/368 |
| 2016/0317953 | A1 * | 11/2016 | Canaia | B29C 48/693 | |
| 2021/0086112 | A1 * | 3/2021 | Brancazio | B01D 29/03 | |
| 2021/0346732 | A1 * | 11/2021 | Tu | A62B 23/02 | |
| 2022/0128164 | A1 * | 4/2022 | Anagnos | F16K 3/085 | |
| 2022/0212151 | A1 * | 7/2022 | Kornacki | B01F 23/2363 | |
| 2022/0305448 | A1 * | 9/2022 | Zhang | F26B 25/063 | |
| 2024/0066443 | A1 * | 2/2024 | Brancazio | B01D 29/86 | |
| 2024/0093800 | A1 * | 3/2024 | Anagnos | F16K 31/041 | |

* cited by examiner

WASTE STREAM HOMOGENIZING APPARATUS AND METHOD

CROSS REFERENCE TO RELATED APPLICATION

This application claims the benefit of previously filed U.S. provisional patent application No. 63/451,688 filed Mar. 13, 2023 for an "Improved Waste Stream Homogenizing Apparatus and Method". The Applicant hereby claims the benefit of this provisional application under 35 U.S.C. § 119. The entire content of this provisional application is incorporated herein by this reference.

FIELD OF THE DISCLOSURE

The present invention pertains to an improved waste stream homogenizing apparatus and method with a housing with an inlet port configured to receive a waste stream and direct the waste stream to an exit port. A central shaft configured to rotate within the housing. A blade with a cutting edge connected with a blade hub, where the blade hub is connected with the central shaft and a sizing screen with sizing holes, the sizing holes arranged in a non-concentric pattern on the sizing screen, where the cutting edge of the blade is in contact with the sizing screen and where the waste stream is forced past the cutting edge and the sizing screen as the central shaft rotates.

BACKGROUND OF THE INVENTION

Applicant is the inventor of a unique waste treatment and disposal system which is the subject of U.S. Pat. No. 6,905,609 B2, incorporated herein by reference. This prior art performed exceptionally well but nevertheless had some limitations which Applicant has identified and which are the subject of this Non-Provisional Patent Application.

By use and testing it was observed that the homogenizer of the prior art waste treatment and disposal system was subject to reduced functional capability due to clogging of the sizing screens. Further, use and observation determined that there was a need to increase turbulence and mixing of the waste in the waste stream within the homogenizer prior to discharge. Still further, Applicant determined that the prior art system would be more useful and function better if the mechanics of the system were simplified and if the structure could be reduced in size and increased in efficiency.

Thus, there is a need in the art for an apparatus and method that addresses the aforementioned problems in a manner that is robust and flexible so as to accommodate a full spectrum of waste treatment and disposal systems with a homogenizer that is less subject to clogging, that creates more turbulence in the waste stream and that is mechanically less complex.

It therefore is an object of this invention to provide an improved waste stream homogenizer that is easy to use and economical to install and operate.

SUMMARY

Accordingly, an improved waste stream homogenizing apparatus and method according to a preferred embodiment consists of a housing with an inlet port configured to receive a waste stream and direct the waste stream to an exit port. A central shaft configured to rotate within the housing. A blade with a cutting edge connected with a blade hub, where the blade hub is connected with the central shaft and a sizing screen with sizing holes, the sizing holes arranged in a non-concentric pattern on the sizing screen, where the cutting edge of the blade is in contact with the sizing screen where the waste stream is forced past the cutting edge and the sizing screen as the central shaft rotates.

In one aspect, the sizing screen non-concentric pattern is a spiral pattern.

In another aspect, the apparatus further includes a spring connected with the blade hub, the spring configured to pressure the blade against the sizing screen.

In a further aspect, the spring is a wavy spring.

In one aspect, the central shaft includes an indexing groove where the indexing groove is configured to receive and retain the blade hub and blade such that the cutting edge of the blade is in contact with the sizing screen.

In one aspect, the blade has a top and a bottom and a side, where the cutting edge is in the bottom and there is at least one hole in the side. In one aspect, the side tapers from the blade hub from the top to the bottom such that the top and bottom converge at an extended end of the blade.

In another aspect, the apparatus further includes cutting edges, not in contact with the sizing screen, in the top and the at least one hole in the side.

In one aspect, there are more than one blade hub with a blade connected with the center shaft and more than one sizing screen configured such that the cutting edge of each blade is in contact with a sizing screen.

In another aspect, there are more than one blade connected with the blade hub.

In one aspect, the apparatus further includes a mixing blade, not in contact with a seizing screen, connected with the central shaft such that the waste stream from the sizing screen is mixed prior to entering the exit port.

According to another embodiment, an improved waste stream homogenizing apparatus includes a housing with an inlet port configured to receive a waste stream and direct the waste stream to an exit port. A central shaft configured to rotate within the housing. At least one blade with a cutting edge connected with a blade hub, where the blade hub is connected with the central shaft. A sizing screen with a plurality of sizing holes, the sizing holes arranged in a non-concentric spiral pattern on the sizing screen, where the cutting edge of the at least one blade is in contact with the sizing screen where the waste stream is forced past the cutting edge and the sizing screen as the central shaft rotates and a spring connected with the at least one blade hub, the spring configured to pressure the at least one blade against the sizing screen.

In one aspect, the central shaft includes an indexing groove where the indexing groove is configured to receive and retain the blade hub with at least one blade such that the cutting edge contacts the sizing screen.

In another aspect, the at least one blade has a top and a bottom, a side and an extended end, further including a cutting edge, not in contact with the sizing screen, in the top and extended end of the blade and where there is at least one hole in the side and where the at least one hole includes a cutting edge.

In one aspect, more than one blade is connected with the blade hub.

In another aspect, the side tapers from the blade hub from the top to the bottom such that the top and bottom converge at an extended end of the blade away from the blade hub.

In one aspect, there are more than one blade hub with connected blades and more than one sizing screens configured such that the cutting edge of each blade is in contact with a sizing screen.

In one aspect, the apparatus further includes a mixing blade, not in contact with a seizing screen, connected with the central shaft such that the waste stream from the sizing screen is mixed prior to entering the exit port.

According to another embodiment, an improved waste stream homogenizing method consists of:

a. providing a housing with an inlet port configured to receive a waste stream and direct the waste stream to an exit port; a central shaft configured to rotate within the housing; at least one blade with a cutting edge connected with a blade hub, where the blade hub is connected with the central shaft and a sizing screen with a plurality of sizing holes, the sizing holes arranged in a non-concentric pattern on the sizing screen, where the cutting edge of the at least one blade is in contact with the sizing screen where the waste stream is forced past the cutting edge and the sizing screen as the central shaft rotates; and
b. introducing a waste stream into the inlet port of the housing.

In one aspect, the sizing screen non-concentric pattern is a spiral pattern.

In another aspect, a spring is connected with the at least one blade hub, the spring configured to pressure the at least one blade against the sizing screen.

In one aspect, the central shaft includes an indexing groove where the indexing groove is configured to receive and retain the blade hub with at least one blade such that the cutting edge contacts the sizing screen.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
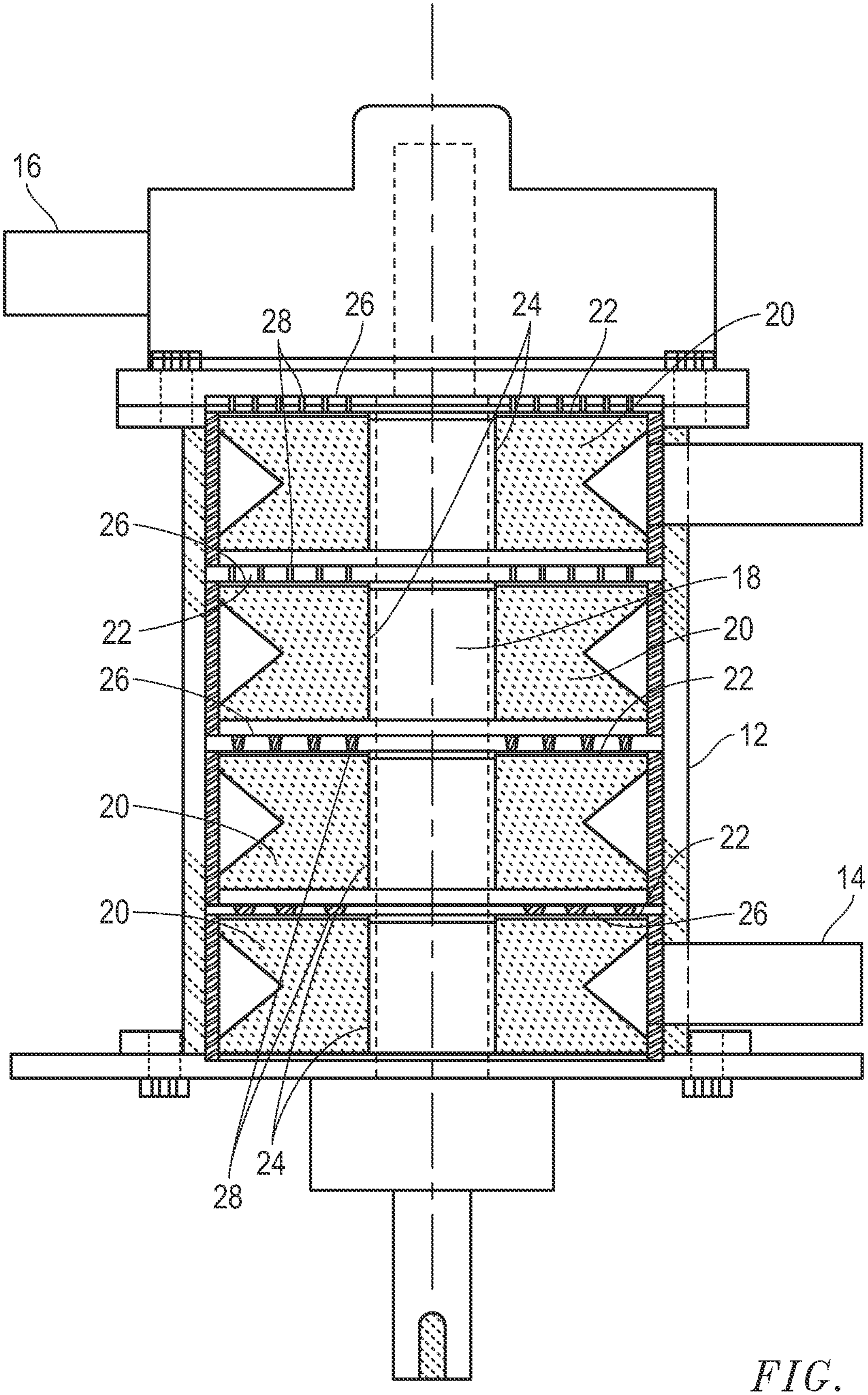
FIG. 1 (Prior Art)
FIG. 1 is a side cut away view of the Prior Art homogenizer.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

One embodiment of the present invention is illustrated by way of example in FIGS. 2-11.

Figure 2:
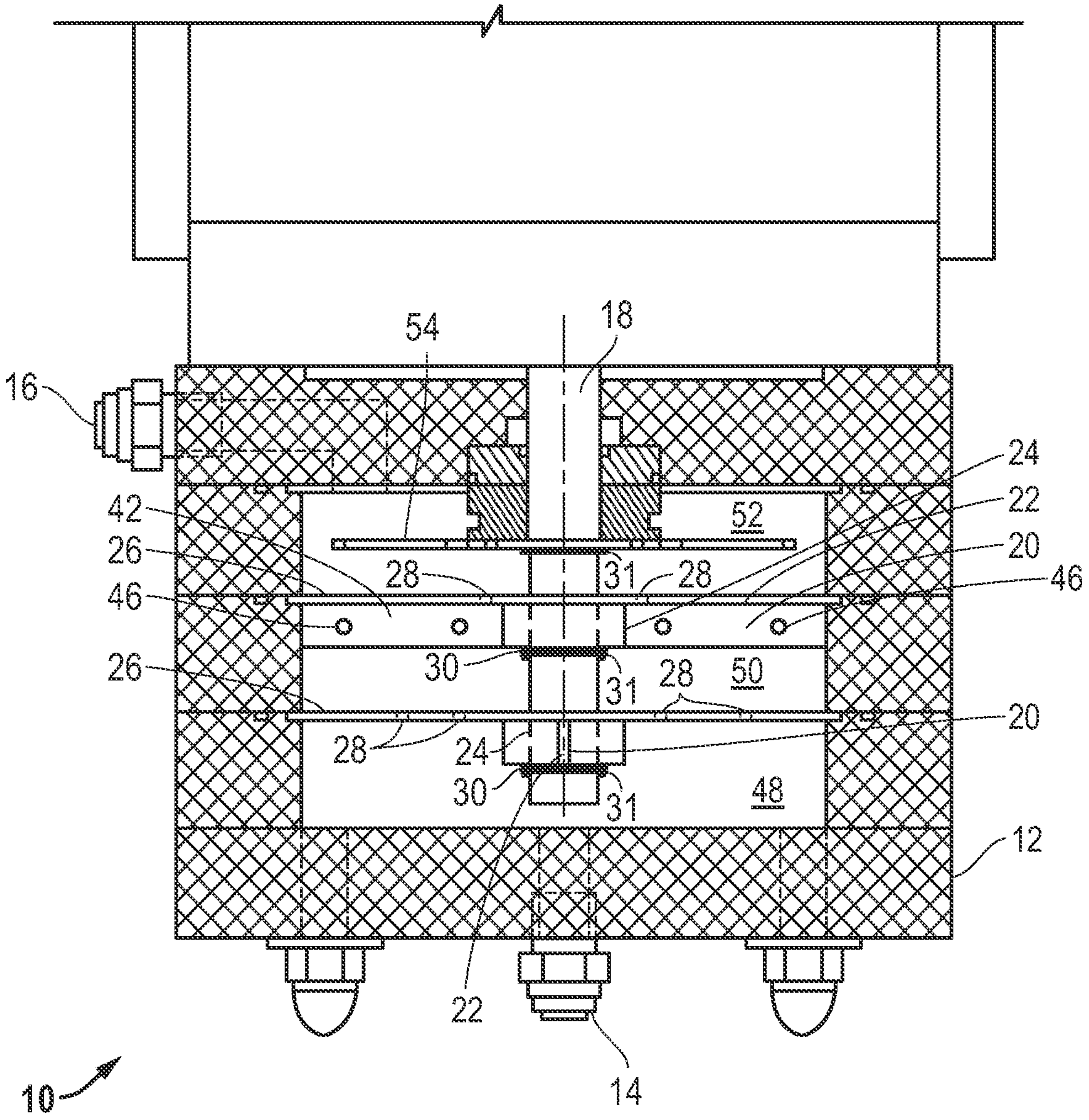
FIG. 2 is a side cut away view of the homogenizer of the present invention.
Figure 3:
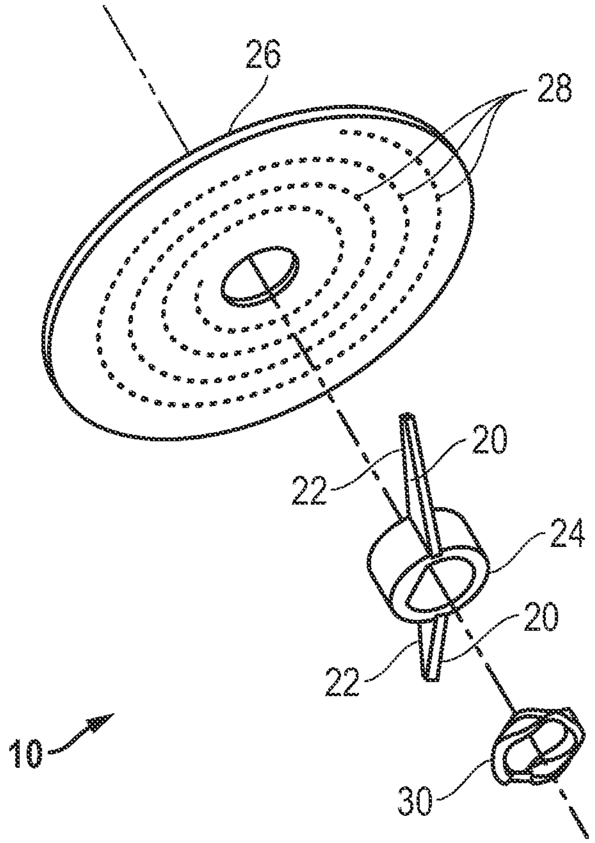
FIG. 3 is a partial exploded of the invention of FIG. 2 showing the sizing screen, blade hub with connected blades and the spring pressure device.

Referring to Prior Art FIG. 1 and FIG. 2, common elements of the prior art homogenizer and the elements of the improved waste stream homogenizing apparatus and method 10 are identified. Each has a housing 12 with an inlet port 14 configured to receive a waste stream and direct the waste stream to an exit port 16. Also, each has a central shaft 18 configured to rotate within the housing 12 and at least one blade 20 with a cutting edge 22 connected with a blade hub 24, where the blade hub 24 is connected with the central shaft 18. Further each has a sizing screen 26 with sizing holes 28.

Continued comparison of Prior Art FIG. 1 with the present invention illustrated in FIG. 2 shows that the present invention is much more compact. The Prior Art required four stages, that is four sets of sizing screens 26 and four sets of blades 20 connected with blade hubs 24, in order to sufficiently homogenize the waste stream and even then, the system was subject to reduced efficiency due to clogging of the sizing screens 26.

FIG. 2 shows that as a result of the improved efficiency because of the reduced clogging of the sizing screens 26 due to the improvements more fully described hereafter, the improved housing 12 only requires two stages, that is two sizing screens 26 in combination with two sets of blades 20 connected with blade hubs 24. A first stage 48 includes a first combination of sizing screen 26 and blade 20 connected to blade hub 24 and a second stage 50 includes a second combination of sizing screen 26 and blade 20 as illustrated.

FIG. 2 also shows a chamber 52 after second stage 50 which includes a mixing blade 54. Mixing blade 54 is not in contact with a seizing screen 26 and is configured to rotate on central shaft 18 as shown and to keep waste particles created from the action of the two sets of blades 20 and sizing screens 26 in suspension prior to discharge through outlet port 16. Mixing blade 54 may include multiple cutting edges 22 when it is determined that the waste being treated requires a final degrading prior to discharge.

Importantly, Applicant determined that clogging occurred in the prior art devices when waste material, in particular fibrous materials from paper, built up in between the cutting edge 22 and the sizing screen 26 causing the cutting edge 22 to rise above the sizing screen 26. The present invention includes a spring 30 (more clearly shown in FIG. 3) connected with the blade hub 24. The spring 30 is configured to pressure the blade 20 against the sizing screen 26. Testing by Applicant shows this improvement greatly reduces clogging and improves operating efficiency as seen by the reduction in size of the housing 12 as discussed above.

Spring 30 can be any mechanical, or electrical mechanical, spring pressure device now known or hereafter developed that achieves the required pressure on blade(s) 20. Preferably, spring 30 is a wave spring washer as are known in the art which slides over the central shaft 18. Retaining ring 31 is placed on the central shaft 18 in the appropriate index groove 36 (See FIG. 5) and holds the wave spring 30 in place. This causes the wave spring 30 to apply pressure to the adjacent blade hub 24 which then forces the cutting edge 22 of blade 20 to be seated against the sizing screen 26. Each stage, 48 and 50, has this arrangement, as shown in FIG. 2. Again, this structure has been found to vastly improve the efficiency of prior art homogenizers and unexpectedly greatly reduce clogging of sizing screens 26.

Importantly, Applicant has determined that clogging of the sizing holes 28 is also greatly diminished where the sizing holes 28 are arranged in a non-concentric pattern on the sizing screen 26. That is, none of the sizing holes 28 in this non-concentric pattern are the same distance from the center of the sizing screen 26.

Figure 4:
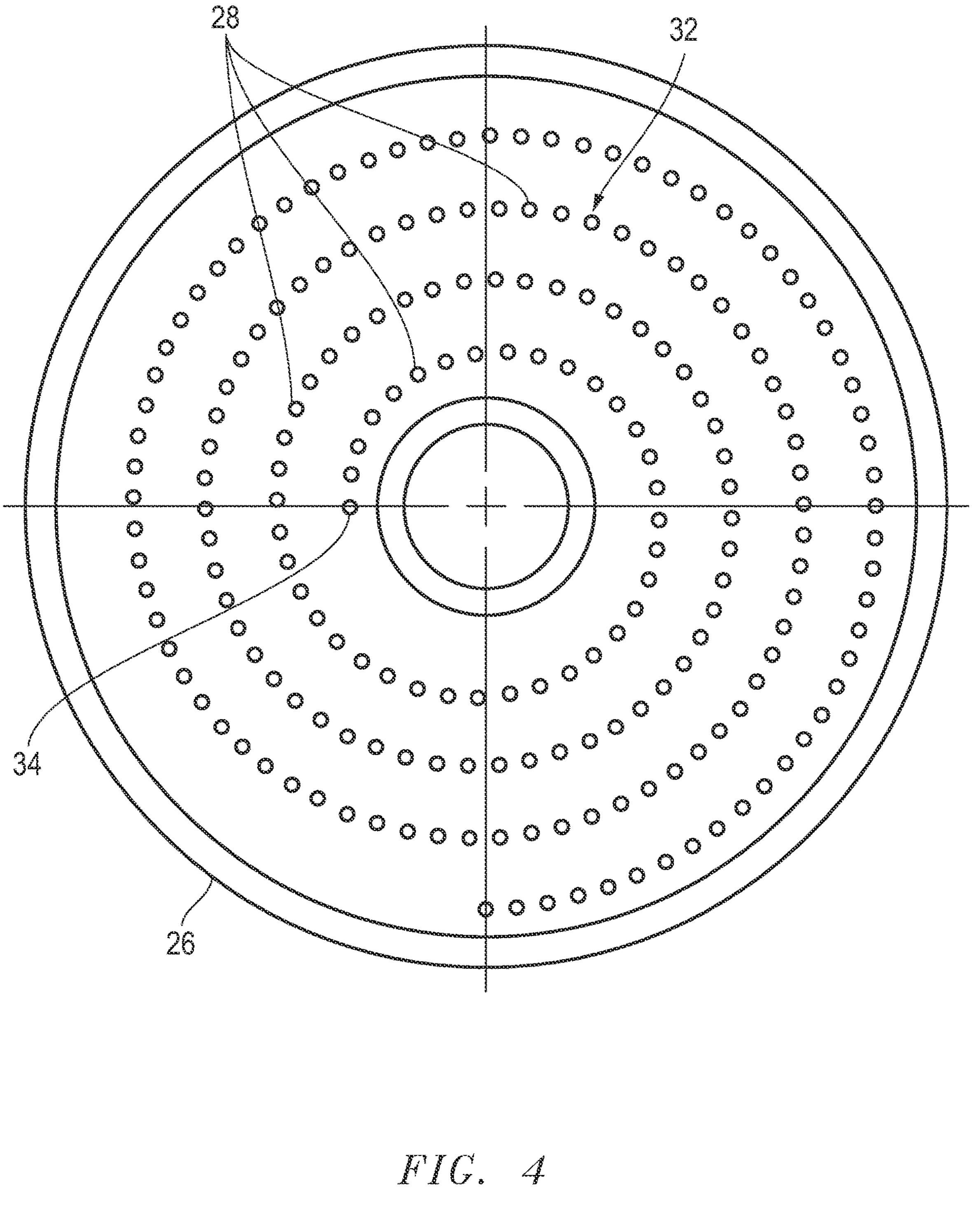
FIG. 4 is a top view of the sizing screen of the invention of FIG. 2 illustrating the non-concentric, spiral, sizing hole pattern.

Referring to FIG. 4, the non-concentric pattern 32 is shown in a spiral pattern 34. Applicant determined that the Prior Art pattern of concentric spacing left areas that were missed and where clogged sizing holes 28 were never contacted by the cutting edge 22 of the blade 20. The non-concentric pattern 32, preferably a spiral pattern 34, ensures that this never happens with the present invention. Sizing holes 28 are spaced apart but at varying distances from the center. Concentric circles, as with the prior art, create a dead space between the circles. With Applicant's non-concentric pattern, such as the spiral pattern, however, there are no dead spaces and the entire area within which the blade 20 rotates encounters a sizing hole 28.

Figure 5:
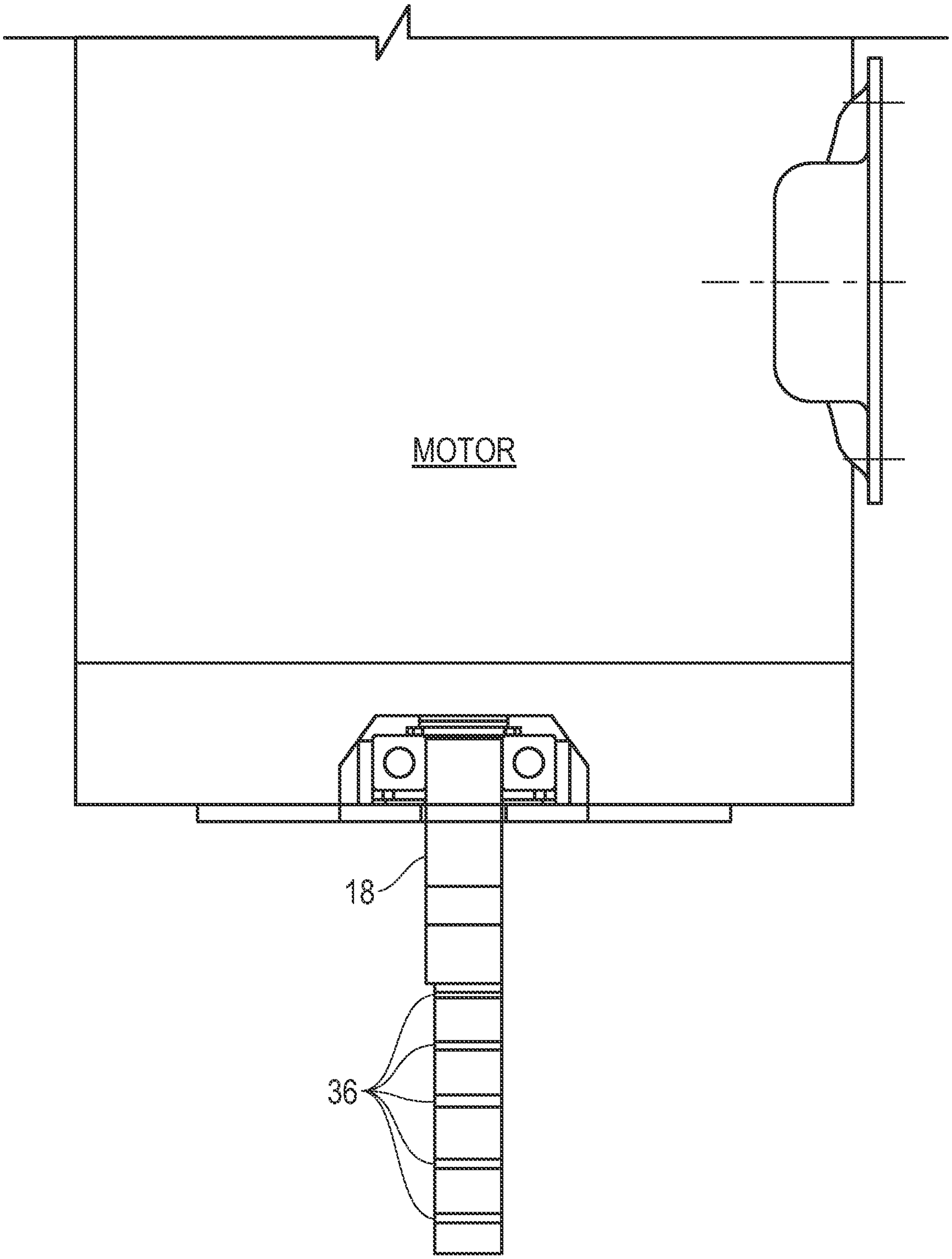
FIG. 5 is side view of the central shaft of the invention of FIG. 2 with indexing grooves.
Figure 6:
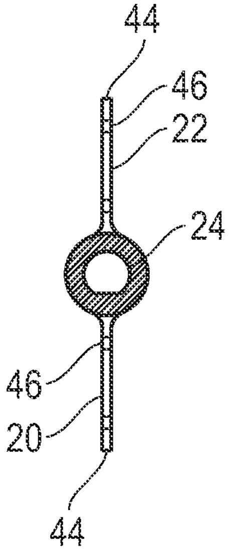
FIG. 6 is a top view of two cutting blades attached to the blade hub of the invention of FIG. 2 with holes in the sides of the cutting blades.
Figure 7:
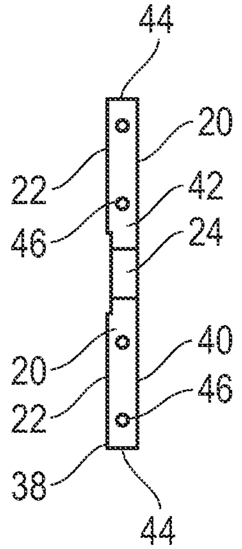
FIG. 7 is a side view of two cutting blades attached to the blade hub of the invention of FIG. 2 with holes in the sides of the cutting blades.

Referring now to FIG. 5, the improved homogenizing apparatus 10 of the present invention has a central shaft 18 that includes an indexing groove 36 where the indexing groove 36 is configured to receive and retain the blade hub 24. The Prior Art required a complex arrangement of seals and bearings and connectivity issues that are eliminated by the provision of these indexing grooves 36. Further, as described above, indexing groove 36 allows the user to easily position blade hub 24 such that cutting edge 22 contacts sizing screen 26 perfectly thus eliminating costly time adjusting prior art blades 20 to make contact. Further, indexing groove 36 provide the structure necessary to retain retaining ring 31 so as to pressure spring 30 against blade hub 24 as described and shown herein. As the figure shows, more than one indexing grove 36 is provided when more than one blade hub 24 and blade 20 are employed.

Figure 8:
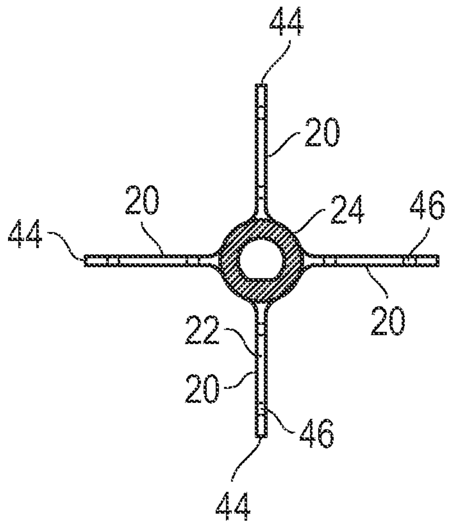
FIG. 8 is a top view of four cutting blades attached to the blade hub of the invention of FIG. 2 with holes in the sides of the cutting blades.
Figure 9:
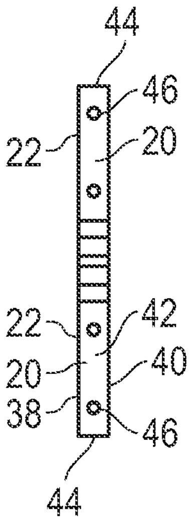
FIG. 9 is a side view of four cutting blades attached to the blade hub of the invention of FIG. 2 with holes in the sides of the cutting blades.

Referring now to FIGS. 6, 7, 8, 9, 10 and 11, a variety of blade 20 configurations are illustrated. FIGS. 6, 7, 10 and 11 show two blades 20 connected with a blade hub 24 and FIGS. 8 and 9 show four blades 20 connected with a blade hub 24. Certainly, any desired number of blades 20 may be used as are deemed suitable for the purposes of the invention.

Figure 10:
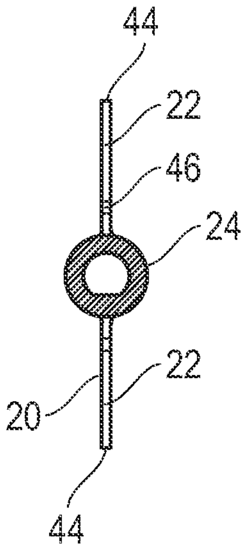
FIG. 10 is a top view of two cutting blades attached to the blade hub of the invention of FIG. 2 with holes in the sides of the cutting blades and with the cutting blades tapered from the blade hub from the top to the bottom to an extended end of the cutting blades.
Figure 11:
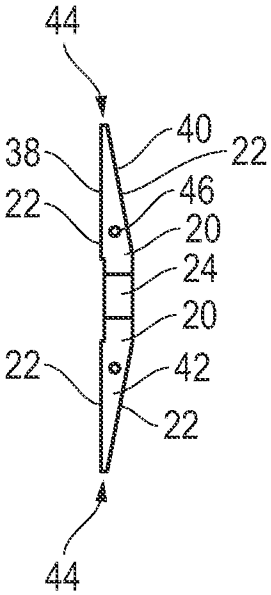
FIG. 11 is a side view of two cutting blades attached to the blade hub of the invention of FIG. 2 with holes in the sides of the cutting blades and with the cutting blades tapered from the blade hub from the top to the bottom to an extended end of the cutting blades.

FIGS. 6-11 also show that the blade 20 has a top 40, a bottom 38 and a side 42. FIGS. 10 and 11 show two blades 20 where the side 42 tapers from the blade hub 24 at the top 40 to the bottom 38 such that the top 40 and bottom 38 converge at an extended end 44 of the blade 20 at the bottom 38. In this regard, Applicant has found that a combination of different shaped blades 20 in homogenizing apparatus 10 increases the efficiency of the device by increasing turbulence and cavitation. It should be understood that it is the bottom 38 that comes in contact with the seizing screen 26.

With regard to the blade 20, Applicant has determined that it is preferred that every exposed edge, top 40, bottom 38 and extended ends 44, preferably is a sharp cutting edge 22 along with even the edges of holes 46. The result is another improvement of the effects of the homogenizer of the present invention over the prior art.

Additionally, Applicant has found that turbulence and cavitation is greatly increased by the inclusion of one or more holes 46 in the sides 42 of the blades 20. This increased movement of the waste stream being treated further reduces clogging and increases efficiency.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

The invention claimed is:

1. An improved waste stream homogenizing apparatus comprising:

a housing (12) defining an interior volume, an inlet port (14) extending through a housing wall;

a central rotatable shaft (18) extending through the interior volume of the housing (12);

a first stage volume (48) within the interior volume and bounded by the housing walls and a first sizing screen (26) having holes (28) extending therethrough, said holes (28) being positioned in a spiral pattern (34), a first stage blade (20) with a cutting edge connected with a first stage blade hub (24) rotatably positioned within the first stage volume (48) and being in contact with the first sizing screen (26), wherein the first stage blade hub (24) is connected to the central rotatable shaft (18), the first stage volume (48) being in fluid communication with the inlet port (14) for receiving a waste stream to be homogenized; and a second stage volume (50) within the interior volume and downstream of the first stage volume (48), having a second sizing screen (26) with holes (28) extending therethrough, said holes (28) being positioned in a spiral pattern (34), a second stage blade (20) with a cutting edge connected with a second stage blade hub (24) rotatably positioned within the second stage volume (50) and being in contact with the second sizing screen (26), wherein the second stage blade hub (24) is connected with the central rotatable shaft (18), the second stage volume (50) being in fluid communication with an exit port (16) downstream of the second sizing screen (26) and extending through a housing wall to permit waste material that has been homogenized to exit the housing (12).

2. The improved waste stream homogenizing apparatus of claim 1 further comprising:

a chamber (52) downstream of the second stage volume (50) and having a mixing blade (54) disposed within the chamber (52) and connected to the central rotatable shaft (18).

3. The improved waste stream homogenizing apparatus of claim 1 further comprising:

a spring (30) connected to each blade hub (24), positioned to urge each respective blade (20) against its respective sizing screen (26).

4. The improved waste stream homogenizing apparatus of claim 3, wherein the spring (30) is a wave spring.

5. The improved waste stream homogenizing apparatus of claim 1, wherein said central rotatable shaft (18) includes a plurality of indexing grooves (36) wherein each indexing groove is capable of receiving and retaining each respective blade hub and blade such that said cutting edge of each respective blade is in contact with each respective sizing screen.

6. The improved waste stream homogenizing apparatus of claim 1, wherein each blade has a top and a bottom and a side, wherein said cutting edge is in the bottom and there is at least one hole in the side.

7. The improved waste stream homogenizing apparatus of claim 6, wherein each side tapers from each blade hub from the top to the bottom such that said top and bottom converge at an extended end of each blade.

8. The improved waste stream homogenizing apparatus of claim 6, further including cutting edges, not in contact with each sizing screen, in the top and the at least one hole in the side.

9. The improved waste stream homogenizing apparatus of claim 1, wherein at least one of said stages has two blades (20) attached to its respective blade hub (24).

10. The improved waste stream homogenizing apparatus of claim 1, wherein at least one of said stages has four blades (20) attached to its respective blade hub (24).

11. A method of homogenizing a waste stream comprising the steps of:

providing a homogenizing apparatus including:

a housing (12) defining an interior volume, an inlet port (14) extending through a housing wall;

a central rotatable shaft (18) extending through the interior volume of the housing (12);

a first stage volume (48) within the interior volume and bounded by the housing walls and a first sizing screen (26) having holes (28) extending therethrough, said holes (28) being positioned in a spiral pattern (34), a first stage blade (20) with a cutting edge connected with a first stage blade hub (24) rotatably positioned within the first stage volume (48) and being in contact with the first sizing screen (26), wherein the first stage blade hub (24) is connected to the central rotatable shaft (18), the first stage volume (48) being in fluid communication with the inlet port (14) for receiving a waste stream to be homogenized; and a second stage volume (50) within the interior volume and downstream of the first stage volume (48), having a second sizing screen (26) with holes (28) extending therethrough, said holes (28) being positioned in a spiral pattern (34), a second stage blade (20) with a cutting edge connected with a second stage blade hub (24) rotatably positioned within the second stage volume (50) and being in contact with the second sizing screen (26), wherein the second stage blade hub (24) is connected with the central rotatable shaft (18), the second stage volume (50) being in fluid communication with an exit port (16) downstream of the second sizing screen (26) and extending through a housing wall to permit waste material that has been homogenized to exit the housing (12);

introducing a waste stream to be homogenized into the inlet port; and withdrawing a homogenized waste stream from the exit port.

12. The method of homogenizing a waste stream of claim 11 wherein, the apparatus includes a spring (30) connected to each blade hub (24), positioned to urge each respective blade (20) against its respective sizing screen (26).

13. The method of homogenizing a waste stream of claim 11 wherein, said central rotatable shaft (18) includes a plurality of indexing grooves (36) wherein each indexing groove is capable of receiving and retaining each respective blade hub and blade such that said cutting edge of each respective blade is in contact with each respective sizing screen.

* * * * *